(12) United States Patent
Wen et al.

(10) Patent No.: US 11,353,201 B2
(45) Date of Patent: Jun. 7, 2022

(54) LIGHTING APPARATUS

(71) Applicant: XIAMEN LEEDARSON LIGHTING CO., LTD, Fujian (CN)

(72) Inventors: Xiaoliang Wen, Fujian (CN); Yongzhe Dong, Fujian (CN); Shouqiang Hou, Fujian (CN)

(73) Assignee: XIAMEN LEEDARSON LIGHTING CO., LTD, Fujian (CN)

( * ) Notice: Subject to any disclaimer, the term of this patent is extended or adjusted under 35 U.S.C. 154(b) by 0 days.

(21) Appl. No.: 17/328,806

(22) Filed: May 24, 2021

(65) Prior Publication Data

US 2021/0364158 A1    Nov. 25, 2021

(30) Foreign Application Priority Data

May 25, 2020    (CN) .......................... 202020897941.0

(51) Int. Cl.
| | |
|---|---|
| *F21V 23/00* | (2015.01) |
| *F21V 23/04* | (2006.01) |
| *F21S 8/02* | (2006.01) |
| *F21V 8/00* | (2006.01) |
| *F21V 29/89* | (2015.01) |
| *F21Y 115/10* | (2016.01) |

(52) U.S. Cl.
CPC ............ *F21V 23/005* (2013.01); *F21S 8/026* (2013.01); *F21V 23/0435* (2013.01); *F21V 29/89* (2015.01); *G02B 6/0083* (2013.01); *F21Y 2115/10* (2016.08)

(58) Field of Classification Search
CPC .... F21V 23/005; F21V 29/89; F21V 23/0435; F21S 8/026
See application file for complete search history.

(56) References Cited

U.S. PATENT DOCUMENTS

| | | | |
|---|---|---|---|
| 2003/0136897 A1* | 7/2003 | Rabkin | ................... G06F 1/182 250/221 |
| 2005/0099824 A1* | 5/2005 | Dowling | .............. A61B 1/0653 362/572 |
| 2007/0222911 A1* | 9/2007 | Murase | ............... G02F 1/13452 349/58 |
| 2008/0174989 A1* | 7/2008 | Robinett | ............... H02J 7/0071 362/183 |
| 2015/0373796 A1* | 12/2015 | Bahrehmand | .......... H05B 47/19 315/129 |
| 2016/0150648 A1* | 5/2016 | De Vaan | ................ H05K 1/056 362/382 |
| 2016/0178173 A1* | 6/2016 | Yadav | .................. H05B 45/395 362/231 |

(Continued)

*Primary Examiner* — Evan P Dzierzynski
(74) *Attorney, Agent, or Firm* — Chun-Ming Shih; Lanway IPR Services

(57) ABSTRACT

A lighting apparatus includes a circuit board, a LED module, a driver, a manual switch and a light housing. The LED module, the driver and the manual switch are directly fixing on the circuit board to make a compact design. The light housing encloses the circuit board and the driver. The light housing has a switch opening for exposing an switch part of the manual switch outside the light housing and has a light opening for a light of the LED module to pass through. The switch part is provided to be operated by a user to change a first parameter of the driver on providing a driving current corresponding to the first parameter to control the LED module.

19 Claims, 8 Drawing Sheets

(56) References Cited

U.S. PATENT DOCUMENTS

2017/0303363 A1* 10/2017 Pyshos .................. H05B 45/10
2018/0266634 A1*  9/2018 Dong ................... F21V 29/763
2018/0310381 A1* 10/2018 Bowen .................. H05B 45/20

* cited by examiner

LIGHTING APPARATUS

FIELD

The present invention is related to a lighting apparatus, and more particularly related to a lighting apparatus with a compact design.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

Light devices are used in various places. Cost and functions are now critical design factors.

If a light device may have low manuafacturing cost while having more flexible functions, the light device may bring more values to human life. Therefore, it is beneficial to design a light device with compact size while keeping more funcitons.

SUMMARY

In some embodiments, a lighting apparatus includes a circuit board, a LED module, a driver, a manual switch and a light housing.

The LED module is mounted on the circuit board.

The driver is mounted on the circuit board.

The manual switch is mounted on the circuit board.

In some embodiments, the LED module, the driver and the manual switch are directly fixing on the circuit board to make a compact design.

The light housing encloses the circuit board and the driver.

The light housing has a switch opening for exposing an switch part of the manual switch outside the light housing and has a light opening for a light of the LED module to pass through.

The switch part is provided to be operated by a user to change a first parameter of the driver on providing a driving current corresponding to the first parameter to control the LED module.

In some embodiments, the circuit board has a aluminum substrate, an insulation layer and a conductive path layer.

The LED module and the driver are electrically connected via the conductive path layer.

The aluminum substrate has a larger thickness than a summation of the insulation layer and the conductive path layer.

In some embodiments, the lighting apparatus may also include a wireless module electrically connected to the driver for receiving an external command form an external device.

The driver decodes the external command to change controlling of the LED module.

In some embodiments, the driver decodes the external command according to the first parameter of the manual switch.

In some embodiments, the manual switch is used for selecting a wireless protocol.

In some embodiments, the manual switch is selectively operated to disable the wireless module.

In some embodiments, the lighting apparatus may also include a rotation switch mounted on the circuit board.

The rotation switch provides the user to set a second parameter.

The second parameter is a continuous value, and the first parameter is a discrete value.

In some embodiments, the second parameter indicates the driver to control a light intensity of the LED module.

In some embodiments, the first parameter is used for selecting an light attribute type, and the second parameter is used for selecting a value of the light atttribute type to control the driver In some embodiments, the LED module has multiple sets of LED units with different color temperatures.

The driver controls the multiple sets of LED units to mix a required color temperature according to the first parameter.

In some embodiments, the light housing has a back cover and a light passing cover.

The light passing cover covers the light opening.

The circuit board is fixed to the back cover.

In some embodiments, the back cover has a circuit board holder for fixing the circuit board.

The circuit board holder is made of metal material for heat dissipation.

In some embodiments, the back cover has a pair of elastic hooks for installing a fixing bar.

The fixing bar fixes the lighting apparatus to a platform.

In some embodiments, the fixing board has a fixing hole for inserting the pair of elastic hooks by deforming the pair of elastic hooks during installation so that the pair of elastic hooks are detachable from the fixing bar by deforming the set of elastic hooks.

In some embodiments, the light passing cover has a lens for forming a light beam.

In some embodiments, a pair of elastic units are disposed on the back cover for fixing to a cavity of a ceiling.

In some embodiments, the lighting apparatus may also include a light guide plate.

The circuit board is a flexible circuit board.

The LED module emits light to the light guide plate to transmit light from the light opening.

In some embodiments, the circuit board is a flat disk shape.

In some embodiments, the driver has multiple driver components disposed on the circuit board surrounding the LED module.

In some embodiments, the driver has a first set of driver components disposed on a first side of the circuit board.

The LED module is disposed on the first side of the circuit board.

The driver has a second set of driver components disposed on a second side of the circuit board.

The first side and the second side are opposite sides of the circuit board.

DETAILED DESCRIPTION

Figure 7:
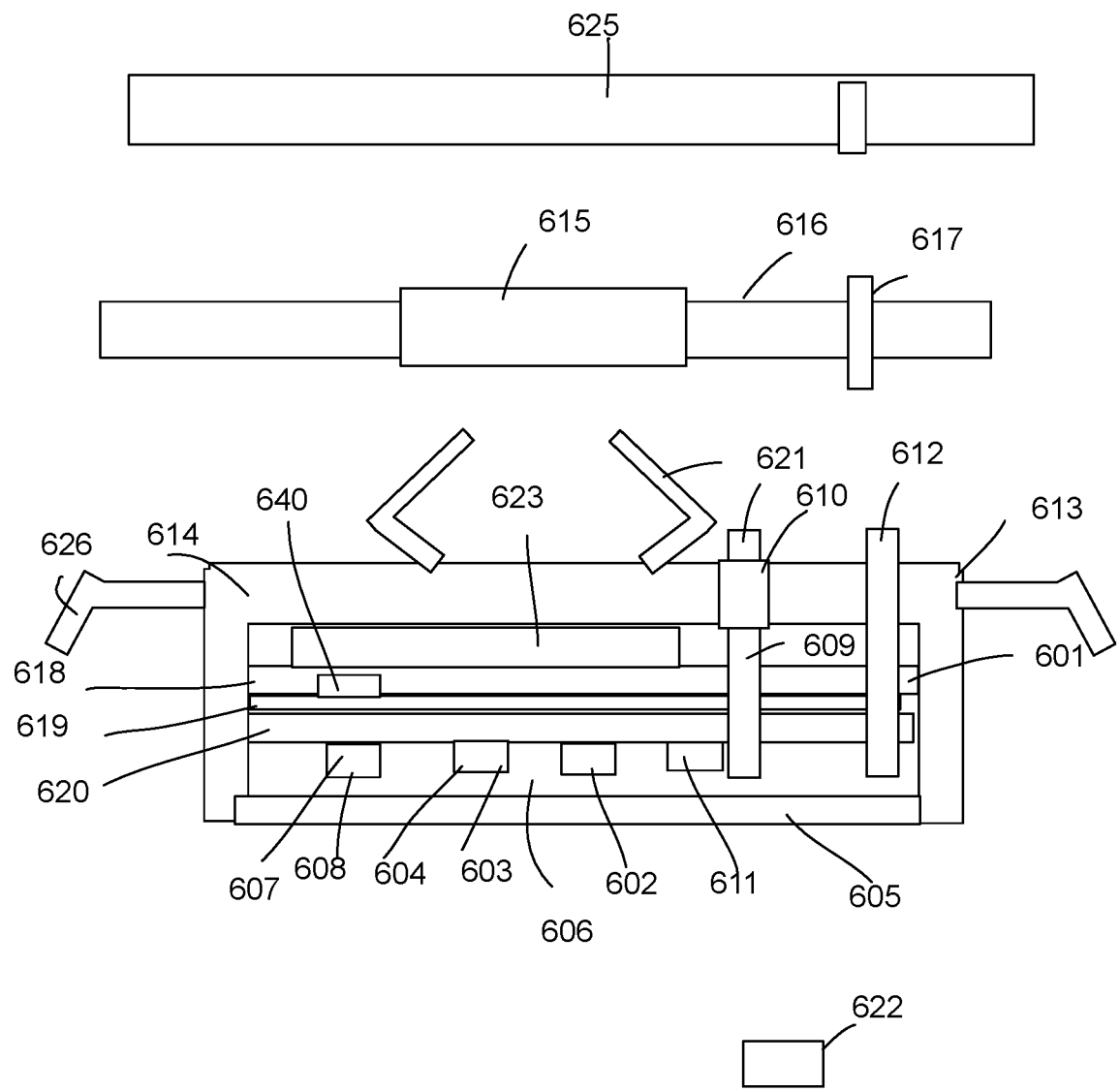
FIG. 7 illustrates a lighting apparatus embodiment.

In FIG. 7, a lighting apparatus includes a circuit board 601, a LED module 604, a driver 607, a manual switch 609 and a light housing 614.

The LED module 604 is mounted on the circuit board 601. The LED module 604 may have multiple types of LED units 603, 602 with different color temperatures or colors. The driver 607 supplies and controls driving currents supplied to the LED units 603, 602 to mix an output light with a required optical parameter, e.g. color temperature, color.

The driver 607 is mounted on the circuit board 601.

The manual switch 609 is mounted on the circuit board 601.

In some embodiments, the LED module, the driver and the manual switch are directly fixing on the circuit board to make a compact design. In other words, no wires or holders are specifically designed for fixing the LED module, the driver and the manual switch separately. All these components are disposed directly on the circuit board. Such design makes the circuit board as a module easily to be installed and manufactured. It lowers the overall manufacturing difficulty and cost.

The light housing 614 encloses the circuit board 601 and the driver 607.

The light housing has a switch opening 610 for exposing an switch part 621 of the manual switch 609 outside the light housing 614 and has a light opening 606 for a light of the LED module 604 to pass through.

The switch part 621 is provided to be operated by a user to change a first parameter of the driver 607 on providing a driving current corresponding to the first parameter to control the LED module 604.

In some embodiments, the circuit board has a aluminum substrate 618, an insulation layer 619 and a conductive path layer 620.

The LED module 604 and the driver 607 are electrically connected via the conductive path layer 620. In other words, the conductive path layer has conductive paths for guiding electricity among the components.

The aluminum substrate 618 has a larger thickness than a summation of the insulation layer 619 and the conductive path layer 620. Such design enhances the heat dissipation and also provides a stronger structure strength.

In some embodiments, the lighting apparatus may also include a wireless module 611 electrically connected to the driver 607 for receiving an external command form an external device 622. The external device 622 sends the external command to the wireless module 611. The external command may be translated by the driver 607 or the wireless module 611. The translation by the driver 607 and the wireless module 611 may include a further mapping. For example, the external command may indicate a low color temperature to be provided. The driver 607 determines corresponding parameters by checking parameters of the mounted LED units 602, 603. The 'low color temperature' command is translated as two sets of driving currents supplied to the two types of LED modules 602, 603. The same external command may be translated to other control signals. Such design increases flexibility of the lighting apparatus. Some lighting apparatuses may be disposed with more types of LED units to provide a subtle control while some lighting apparatuses only provide less control of the color temperatures. However, with the translation design, various requests are met just under different levels.

The driver decodes the external command to change controlling of the LED module.

In some embodiments, the driver decodes the external command according to the first parameter of the manual switch. This is particularly helpful to mix the manual switch and the external command.

For example, the manual switch may be set as light intensity. When the manual switch is set as the light intensity, the external command may provide a value related to the light intensity. In some embodiments, the manual switch may be used for indicating the role of the lighting apparatus among multiple lighting apparatuses installed in a place. For example, five lighting apparatuses are installed in a room. Four lighting apparatuses are placed in peripheral locations while one lighting apparatus is placed at a center of the room.

The manual switch may be used for indicating the location of the lighting apparatus is placed. When the same external command is broadcasted to the five lighting apparatuses, the drivers of the five lighting apparatuses decode the same command to different control signals according to the first parameter, which now indicates a location of the lighting apparatus.

Such design makes the installation with more flexibility of the lighting apparatuses with simple modification and low cost. This scheme may be extended for various functions.

In some embodiments, the manual switch is used for selecting a wireless protocol, e.g. to select a Wi-Fi or Bluetooth protocol to be activated in the driver.

In some embodiments, the manual switch is selectively operated to disable the wireless module. This is particularly important when some places have security concern. The wireless module may need to be firmly disabled instead of a software type disabling. IoT is helpful and powerful, but there are so many hackers in the world and such function to manually disable wireless functions is very helpful.

In fact, in some embodiments, the settings may be provided to the driver via wireless transmission. When the settings are transmitted, the manual switch is operated to disable the wireless function. Such design ensures security while providing certain flexibility.

In some embodiments, the lighting apparatus may also include a rotation switch 612 mounted on the circuit board 601.

The rotation switch 612 provides the user to set a second parameter.

The second parameter is a continuous value, and the first parameter is a discrete value. For example, the second parameter may be 0.11232, 0.24234 or other real number in a continuous range, instead of a limited candidate values like 2000K, 3000K, 4000K, which provides three discrete values to select therefrom.

Two-switch design is found very helpful for at least following reasons.

First, it is found that the rotation switch may be used independently for adjusting a light setting, e.g. light intensity. Users may buy the lighting apparatus and select an absolute light intensity, which may refers to a maximum light intensity of the lighting apparatus. The setting may be made only once when the users buy the lighting apparatus before installing the lighting apparatus on a ceiling.

Second, it is found that the two switches may be mixed to provide multiple control combination.

In some embodiments, the second parameter indicates the driver to control a light intensity of the LED module.

In some embodiments, the first parameter is used for selecting an light attribute type, and the second parameter is used for selecting a value of the light atttribute type to control the driver. For example, the manual switch may indicate the attribute type as color temperature, and the rotation switch is used for selecting a continuous value of color temperature. The manual switch may indicate the attribute type as blue color value, and the rotation switch may be used for setting a continuous value for the blue light intensity. Other control designs may be implemented when the two-switch design is provided in the lighting apparatus.

In some embodiments, the LED module has multiple sets of LED units with different color temperatures. For example, two LED units 602, 603 may have different color temperatures.

The driver controls the multiple sets of LED units to mix a required color temperature according to the first parameter.

In some embodiments, the light housing 614 has a back cover 613 and a light passing cover 605.

The light passing cover 605 covers the light opening 606.

The circuit board is fixed to the back cover 613.

In some embodiments, the back cover 613 has a circuit board holder 623 for fixing the circuit board 601.

The circuit board holder 623 is made of metal material for heat dissipation.

In some embodiments, the back cover 613 has a pair of elastic hooks 621 for installing a fixing bar 616.

The fixing bar 616 fixes the lighting apparatus to a platform 625, e.g. a junction box or a ceiling cavity bracket.

In some embodiments, the fixing board has a fixing hole 615 for inserting the pair of elastic hooks 621 by deforming the pair of elastic hooks 621 during installation so that the pair of elastic hooks 621 are detachable from the fixing bar 616 by deforming the set of elastic hooks 621. The elastic hooks 621 may define a narrow diameter and a large diameter. When the elastic hooks 621 are pressed to deform the large diameter is decreased for passing the elastic hooks 621 through the fixing hole 615. When the elastic hooks 621 enters the fixing hole 615, the elastic hooks 621 are released so that the larger diameter is larger than the diameter of the fixing hole 615 for the elastic hooks 621 staying in the fixing hole 615 of the fixing bar 616.

In some embodiments, the light passing cover has a lens for forming a light beam.

In some embodiments, a pair of elastic units 626, e.g. a pair of torsion springs, are disposed on the back cover for fixing to a cavity of a ceiling. Such design makes the lighting apparatus to be installed to a downlight platform as a downlight device. Such downlight device is more compact and with lower cost.

Figure 8:
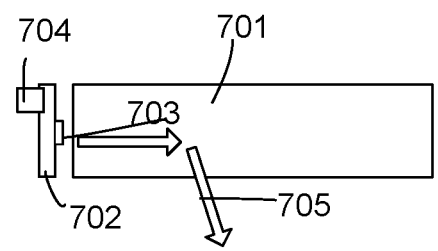
FIG. 8 shows another type of a lighting apparatus.

In FIG. 8, the lighting apparatus may also include a light guide plate 70. The light guide plate 70 guides the light 705 from the LED module 703 mounted on the flexible circuit board 702. The flexible circuit board 702 may be bent as a ring while still used for mounting the driver 704.

The circuit board is a flexible circuit board.

The LED module emits light to the light guide plate to transmit light from the light opening.

In some embodiments, the circuit board is a flat disk shape, as shown in FIG. 7 and FIG. 1 to FIG. 6.

In some embodiments, the driver has multiple driver components disposed on the circuit board surrounding the LED module, as illustrated in FIG. 7.

In FIG. 7, the driver has a first set of driver components disposed on a first side of the circuit board.

The LED module is disposed on the first side of the circuit board.

The driver has a second set of driver components 640 disposed on a second side of the circuit board.

The first side and the second side are opposite sides of the circuit board.

Figure 1:
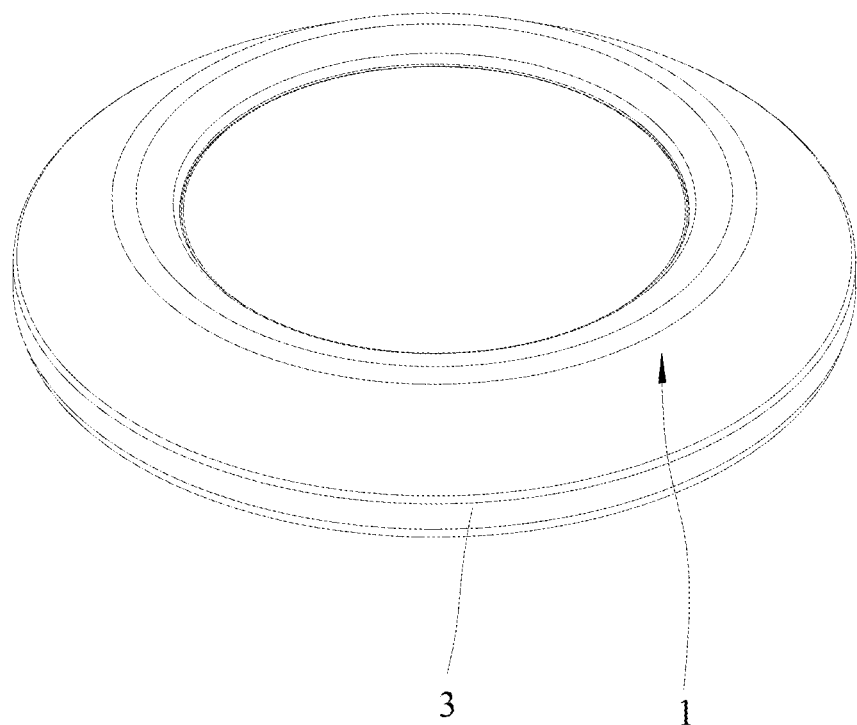
FIG. 1 illustrates a lighting apparatus embodiment.

Please refer to FIG. 1. In FIG. 1, the lighting apparatus 1 is a ceiling light, which may also be a spot light, a downlight or a panel light.

The lighting apparatus 1 has a light housing 3.

Figure 2:
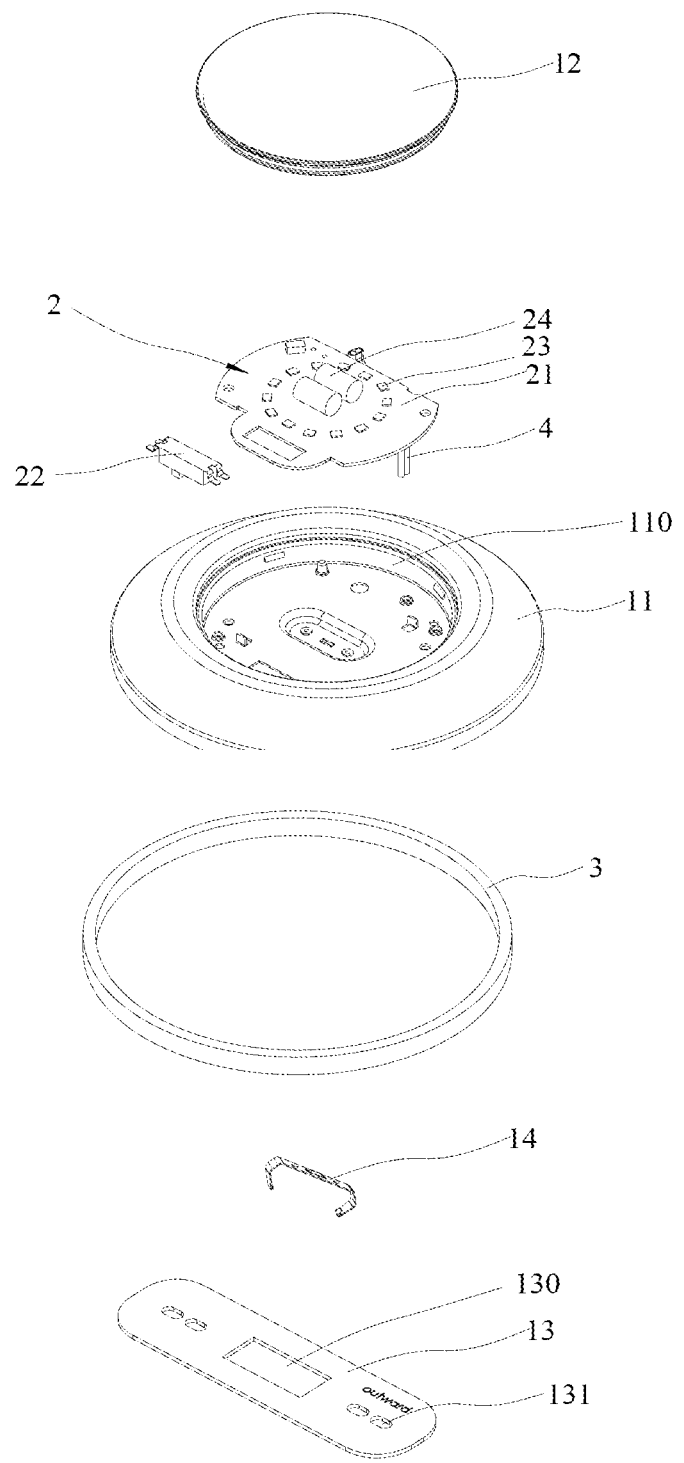
FIG. 2 illustrates an exploded view of the embodiment in FIG. 1.

Please refer to FIG. 2, which shows an exploded view of the example in FIG. 1.

In FIG. 2, the lighting apparatus has a light passing cover 12 fixed to a heat sink 11 which may be made of metal material.

The heat sink 11 has a circuit board holder 110 for holding a circuit board 2 mounted with a driver 24 and LED module 23 on a first side 21 of the circuit board 2. There is a manual switch 22 mounted on the circuit board 2. There is a wire connector 4 connecting to an external power source, e.g. 110V AC power.

The light housing 3 fixes the heat sink 11. A pair of elastic hooks 14 is installed on a back cover of the light housing 3 to fixing to a fixing bar 13 by inserting into a fixing hole 130. The fixing bar 13 may have screw holes 131 to fix the fixing bar to a platform.

Figure 3:
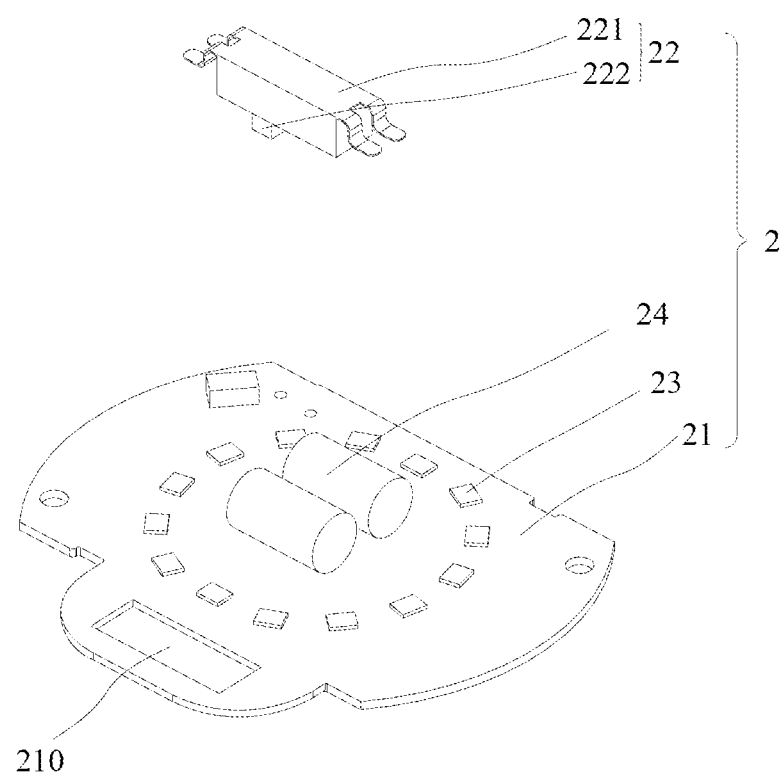
FIG. 3 illustrates a circuit board example.

Please refer to FIG. 3. The manual switch 22 has an electrode 222 electrically connected to the driver 24. The manual switch 22 has a housing 221 to be fixed to a holder cavity 210 on the circuit board 2.

Figure 4:
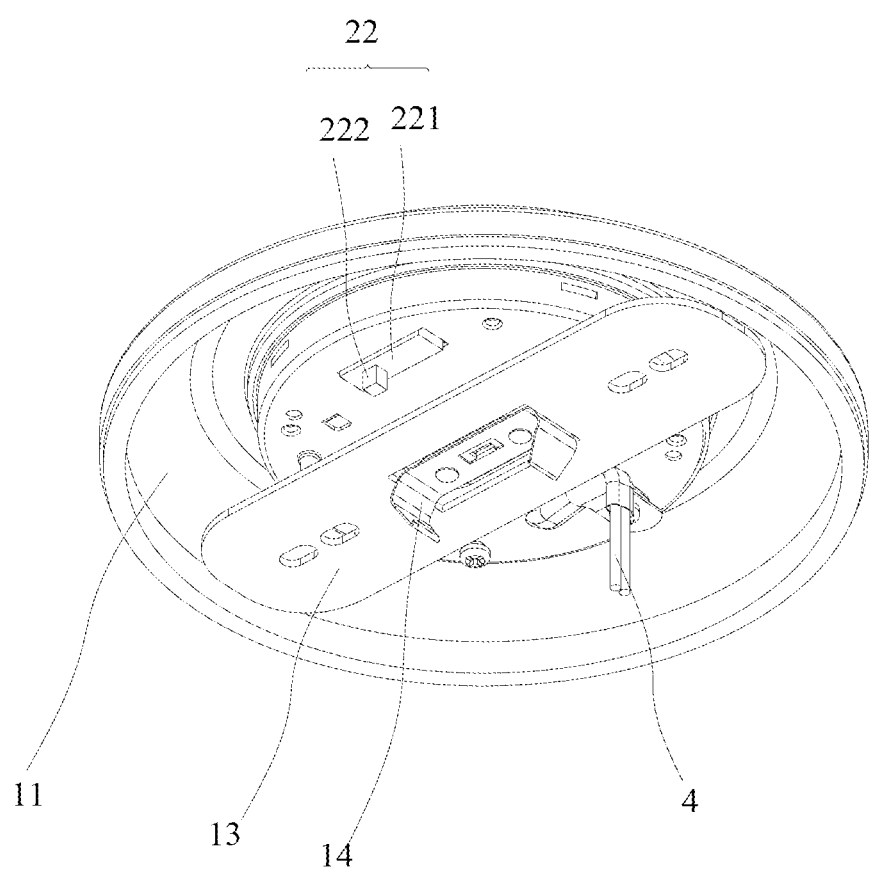
FIG. 4 illustrates a fixing bar fixed to a back cover in a lighting apparatus.

Please refer to FIG. 4. The back cover of the light housing has a switch opening for exposing a switch part of the manual switch to be operated by the users. Other reference numerals discussed in previous drawings refer to the same components and are not repeated again for brevity.

Figure 5:
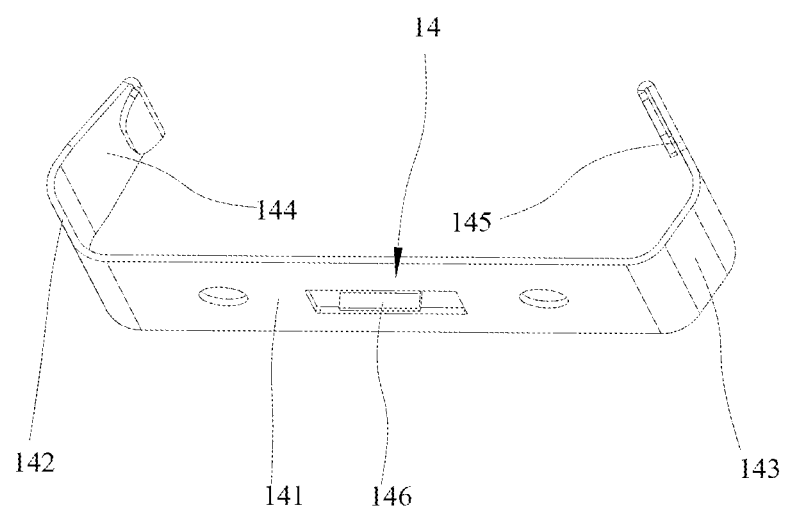
FIG. 5 illustrates a fixing bar example.

Please refer to FIG. 5, which illustrates the pair of elastic hooks 14. There are two elastic bending parts 144, 145 bent from two sides 142, 143.

The pair of elastic hooks 14 are fixed to the back cover with a connector 146 by fixing the main body 141 to a surface of the back cover of the light housing.

Figure 6:
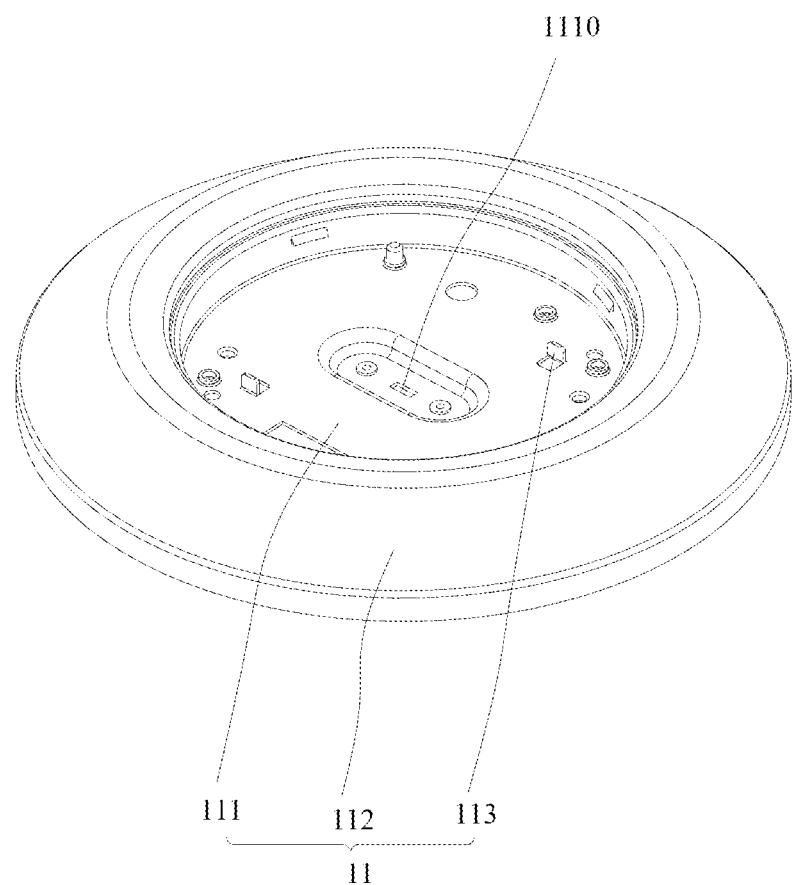
FIG. 6 illustrates a top view of components in an example.

Please refer to FIG. 6. In FIG. 6, the connector 1110 is used for connecting to the pair of elastic hooks 14. The heat sink 11 also has a aligning structure 13, main body 112 and a circuit board holder 111 for fixing the circuit board mentioned above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus comprising:
a circuit board;
a LED module mounted on the circuit board;
a driver mounted on the circuit board;
a manual switch mounted on the circuit board; and
a light housing enclosing the circuit board and the driver, wherein the light housing has a switch opening for exposing an switch part of the manual switch outside the light housing and has a light opening for a light of the LED module to pass through, wherein the switch part is provided to be operated by a user to change a first parameter of the driver on providing a driving current corresponding to the first parameter to control the LED module, wherein the LED module has multiple sets of LED units with different color temperatures, the driver controls the multiple sets of LED units to mix a required color temperature according to the first parameter.

2. The lighting apparatus of claim 1, wherein the circuit board has a aluminum substrate, an insulation layer and a conductive path layer, wherein the LED module and the driver are electrically connected via the conductive path layer, wherein the aluminum substrate has a larger thickness than a summation of the insulation layer and the conductive path layer.

3. The lighting apparatus of claim 1, further comprising a wireless module electrically connected to the driver for receiving an external command form an external device, wherein the driver decodes the external command to change controlling of the LED module.

4. The lighting apparatus of claim 3, wherein the driver decodes the external command according to the first parameter of the manual switch.

5. The lighting apparatus of claim 3, wherein the manual switch is used for selecting a wireless protocol.

6. The lighting apparatus of claim 3, wherein the manual switch is selectively operated to disable the wireless module.

7. The lighting apparatus of claim 1, further comprising a rotation switch mounted on the circuit board, wherein the rotation switch provides the user to set a second parameter, wherein the second parameter is a continuous value, and the first parameter is a discrete value.

8. The lighting apparatus of claim 7, wherein the second parameter indicates the driver to control a light intensity of the LED module.

9. The lighting apparatus of claim 7, wherein the first parameter is used for selecting an light attribute type, and the second parameter is used for selecting a value of the light attribute type to control the driver.

10. The lighting apparatus of claim 1, wherein the light housing has a back cover and a light passing cover, wherein the light passing cover covers the light opening, the circuit board is fixed to the back cover.

11. The lighting apparatus of claim 10, wherein the back cover has a circuit board holder for fixing the circuit board, wherein the circuit board holder is made of metal material for heat dissipation.

12. The lighting apparatus of claim 10, wherein the back cover has a pair of elastic hooks for installing a fixing bar, wherein the fixing bar fixes the lighting apparatus to a platform.

13. The lighting apparatus of claim 12, wherein the fixing bar has a fixing hole for inserting the pair of elastic hooks by deforming the pair of elastic hooks during installation so that the pair of elastic hooks are detachable from the fixing bar by deforming the set of elastic hooks.

14. The lighting apparatus of claim 10, wherein the light passing cover has a lens for forming a light beam.

15. The lighting apparatus of claim 10, wherein a pair of elastic units are disposed on the back cover for fixing to a cavity of a ceiling.

16. The lighting apparatus of claim 1, further comprising a light guide plate, wherein the circuit board is a flexible circuit board, the LED module emits light to the light guide plate to transmit light from the light opening.

17. The lighting apparatus of claim 1, wherein the circuit board is a flat disk shape.

18. The lighting apparatus of claim 17, wherein the driver has multiple driver components disposed on the circuit board surrounding the LED module.

19. The lighting apparatus of claim 17, wherein the driver has a first set of driver components disposed on a first side of the circuit board, the LED module is disposed on the first side of the circuit board, the driver has a second set of driver components disposed on a second side of the circuit board, the first side and the second side are opposite sides of the circuit board.

\* \* \* \* \*